United States Patent [19]
Wada et al.

[11] Patent Number: 5,343,317
[45] Date of Patent: Aug. 30, 1994

[54] OPTICALLY COMPENSATING FILM, OPTICAL COMPENSATOR, AND LIQUID CRYSTAL DISPLAY INCORPORATING THE SAME

[75] Inventors: Hiroshi Wada; Shinji Wada; Osamu Okumura, all of Suwa; Rinjiro Ichikawa, Tokyo; Kenji Hashimoto, Tokyo; Takashi Yamada, Tokyo, all of Japan

[73] Assignees: Seiko Epson Corporation; Fujimori Kogyo Co., Tokyo, Japan

[21] Appl. No.: 969,158

[22] PCT Filed: Jun. 15, 1992

[86] PCT No.: PCT/JP92/00763
§ 371 Date: Apr. 14, 1993
§ 102(e) Date: Apr. 14, 1993

[87] PCT Pub. No.: WO92/22837
PCT Pub. Date: Dec. 23, 1992

[30] Foreign Application Priority Data
Jun. 17, 1991 [JP] Japan .................. 3-173184

[51] Int. Cl.⁵ ............................. G02F 1/1335
[52] U.S. Cl. ........................... 359/73; 359/63
[58] Field of Search .......... 359/63, 73, 102, 103

[56] References Cited
U.S. PATENT DOCUMENTS
5,061,042 10/1991 Nakamura et al. .............. 359/63
5,142,393 8/1992 Okumura et al. ............... 359/73

FOREIGN PATENT DOCUMENTS
1-118805 5/1989 Japan .
2-42406 2/1990 Japan .
3-33719 2/1991 Japan .

Primary Examiner—William L. Sikes
Assistant Examiner—Huy Mai
Attorney, Agent, or Firm—Armstrong, Westerman, Hattori, McLeland & Naughton

[57] ABSTRACT

A polymer film from a composition comprising a polymer (A) giving a film with a refractive index of $n_D \geq 1.60$, an Abbe number of $\nu_D \leq 30.0$ and a glass transition temperature of $Tg = 60°$ to $160°$ C. and a polymer (B) giving a film with a refractive index of $n_D < 1.60$ is oriented at least in one direction to provide an oriented film. It is arranged that this oriented film has a retardation value of $R-60-1000$ nm and a wavelength dispersion value of $\nu_{RF} \geq 1.10$. An optically compensating film comprising this oriented film or an optical compensator comprising the oriented film and an optically isotropic film laminated at least on one side thereof is used for color compensation in a liquid crystal display panel. In this manner, a liquid crystal display device solving the long-standing problems of coloration and low contrast ratio is obtained.

10 Claims, 4 Drawing Sheets

OPTICALLY COMPENSATING FILM, OPTICAL COMPENSATOR, AND LIQUID CRYSTAL DISPLAY INCORPORATING THE SAME

TECHNICAL FIELD

The present invention relates to an optically compensating film and an optical compensator which are capable of providing a liquid crystal display with improved display coloration and contrast ratio.

BACKGROUND ART

As a liquid crystal display device utilizing a supertwisted nematic structure, an STN liquid crystal display of the construction: first polarizer/driver liquid crystal cell/hue compensating liquid crystal cell/second polarizer has been developed [Nikkei Microdevices, August 1987, pp. 36–38 and Nikkei Microdevices, October 1987, pp. 84–88].

The light incident on and passing through the first polarizer becomes linearly polarized light which, in turn, is converted to elliptically polarized light by birefringence as it passes through the driver liquid crystal cell. The elliptic polarization rate and orientational angle involved are dependent on the wavelength. However, the light emerging from the driver liquid crystal cell is twisted in the reverse direction as it passes through the hue compensating liquid crystal cell, so that the elliptically polarized light is reconverted to linearly polarized light (that is to say the phase difference is cancelled), which is taken out through the second polarizer. In this way, the wavelength dependence of transmitted light is eliminated and a substantially white-and-black display is obtained. Therefore, if necessary, a full-color display can be implemented by adding color filters.

The above STN liquid crystal display incorporating a driver liquid crystal cell and a hue compensating liquid crystal cell is thick and heavy and, as an additional disadvantage, costly to manufacture. There also is the problem that the display is too dark in the reflecting mode.

Therefore, to overcome these disadvantages, a system (hereinafter referred to as Formulated Super Twisted Nematic (FTN) mode) incorporating an optical compensator comprising a monoaxially oriented polymer film laminated with an optically isotropic film on either side thereof in lieu of said hue compensating liquid crystal cell is attracting attention. The basic architecture of this FTN liquid crystal display is: polarizer/liquid crystal cell/optical compensator/polarizer.

Japanese Patent Application Kokai No. 64-519, as filed earlier by one of the inventors of the present invention, discloses that, as the monoaxially oriented film mentioned above, polyvinyl alcohol, polyester, polyetheramide, polyethylene, etc. can be employed.

Japanese Patent Application Kokai No. 1-118805 describes an optical compensator obtainable by orienting a film of polyvinyl alcohol or a derivative thereof in one direction, treating the oriented film with an aqueous boric acid-containing solution and laminating an optically non-oriented polymer film on one or either side of said oriented film. The derivative of polyvinyl alcohol mentioned above means a polyvinylacetal such as polyvinylbutyral, polyvinylformal, etc.

Japanese Patent Application Kokai No. 1-118819 and Japanese Patent Application Kokai No. 1-124821 disclose the use of an optically compensating film comprising an oriented synthetic resin film or an optical compensator comprising said optically compensating film and an optically isotropic amorphous film laminated at least on one side thereof as one of the transparent electrode-supporting substrates of a liquid crystal cell. Japanese Patent Application Kokai No. 1-127329 discloses a laminate having an optical compensating function which is obtainable by laminating an optical compensator similar to the above with a release sheet through an adhesive layer. It is disclosed in these patent literature that polycarbonate, phenoxy resin, polyparabanic acid resin, fumaric acid resin, polyamino acid resin, polystyrene, polysulfone, polyether polysulfone, polyarylene ester, polyvinyl alcohol, ethylene-vinyl alcohol copolymer, polyvinyl chloride, polymethyl methacrylate, polyester, cellulosic polymer, etc. can be employed. Incidentally, it is to be noted that these patent applications as well as Japanese Patent Application Kokai No. 2-158701 referred to below are all those filed by another applicant among the present applicants.

Japanese Patent Application Kokai No. 2-158701 discloses a composite optical compensator comprising a birefringent multi-layer film obtainable by laminating a plurality of low-oriented birefringent unit cast films having a retardation value of 30 to 1000 nm with alignment of respective optic axes and, as film materials, mentions crosslinking resins such as phenoxyether crosslinking resin, epoxy resin, acrylic resin, urethane resin, etc., polycarbonate, polyarylene ester, polyethersulfone, polysulfone, polyethylene terephthalate, polybutylene terephthalate, polyvinyl chloride, polystyrene, ethylene-vinyl alcohol copolymer, polyvinyl alcohol, amorphous polyolefin, fumaric acid resin, polyamino acid resin, ABS resin and so on.

Japanese Patent Application Kokai No. 2-256003 discloses an optical film, primarily intended for an optical compensator, which is obtainable by orienting a thermoplastic polymer film without thickness variation monoaxially at right angles with the extruding direction or biaxially and having a retardation value of not more than 1200 nm with a variance of not more than 10% in retardation value and, as said thermoplastic polymer, mentions polycarbonate resin, poly(meth)acrylate resin, polystyrene resin, acrylonitrile resin, polyester resin (polyethylene terephthalate, polyester copolymer, etc.), polyamide resin, polyvinyl chloride, polyolefin resin, polysulfone, polyethersulfone, fluororesin and so on.

Japanese Patent Application Kokai No. 2-256023 discloses a liquid crystal display including a film of planarly oriented molecules having a negative intrinsic birefringence value and a monoaxially oriented film of a polymer having a positive birefringent value as interposed between a liquid crystal cell and a polarizer, and mentions, as examples of the former polymer, polystyrene and acrylate polymers and, as examples of the latter polymer, polycarbonate, polyarylate, polyethylene terephthalate, polyethersulfone, polyphenylene sulfide, polyphenylene oxide, polyallylsulfone, polyamideimide, polyolefin, polyacrylnitrile, cellulose and polyester.

Japanese Patent Application Kokai No. 2-257103 teaches an optical compensator comprising a laminate of an optically compensating film obtainable by monoaxial orientation of a polyvinyl alcohol film and having a retardation value of 300 to 800 run with a polysulfone or polyarylate film.

However, with any of the optically compensating films comprising monoaxially oriented films formed from the polymers described in the above profusion of literature or any of the optical compensators fabricated by laminating an optically isotropic film on one or either side of said optically compensating film, it is impossible to compensate for the phase difference caused by the STN cell over the entire wavelength region, thus failing to fully solve the problems of coloration and low contrast ratio.

Therefore, although these technologies are able to solve the problems of great thickness and weight which are inevitable with the STN liquid crystal display mode employing a driver liquid crystal cell and a hue compensating liquid crystal cell, they are inferior to the mode employing a hue compensating liquid crystal cell in coloration and contrast ratio. This aspect is an important problem to be solved of the FTN mode employing an optical compensator made of polymer film.

The object of the present invention is to provide a radical solution to the long-standing problems of coloration and low contrast ratio in the FTN mode employing an optically compensating film or an optical compensator for hue compensation in a liquid crystal display.

DISCLOSURE OF INVENTION

The optically compensating film of the present invention is an oriented film obtainable by drawing, at least in one direction, a polymer film cast or otherwise produced from a composition comprising a polymer (A) giving a film with a refractive index of $n_D \geq 1.60$, an Abbe number of $\nu_D \leq 30.0$ and a glass transition temperature of $Tg = 60°-160°$ C. and a polymer (B) giving a film having a refractive index of $n_D < 1.60$.

It is particularly desirable that the oriented film have a retardation value of $R = 60-1000$ nm and a wavelength dispersion value, as defined by the following equation, of $\nu_{RF} \geq 1.10$.

$$\nu_{RF} = \Delta n \cdot d(450 \text{ nm}) / \Delta n \cdot d(590 \text{ nm})$$

The optical compensator of the present invention is a laminate comprising the above optically compensating film and an optically isotropic film as laminated on at least one side of said film.

The present invention is now described in detail hereinafter.

Polymer (A)

As the polymer (A), a polymer capable of giving a film which meets all of the following requirements is employed.

Refractive index $n_D \geq 1.60$
Abbe number $\nu_D \leq 30.0$
Glass transition temperature Tg 60°-160° C.

The refractive index $n_D$ stands for the refractive index relative to the sodium D line (589 nm) as measured in accordance with ASTM D-542. If the refractive index $n_D$ is less than 1.60, the problems of coloration and low contrast ratio cannot be solved even if the other requirements are met.

The Abbe number $\nu_D$ is an indicator expressed by the equation $\nu_D = (n_D - 1)/(n_F - n_C)$, wherein $n_D$, $n_F$ and $n_c$ are refractive indices with respective to the D line (589 nm), F line (486 run) and C line (656 run), respectively. If this Abbe number exceeds 30.0, the problems of coloration and low contrast ratio cannot be solved even if the other requirements are met.

It is also necessary that the glass transition temperature $T_g$ is within the range of 60° to 160° C. If the glass transition temperature is below 60° C., heat resistance will be inadequate. On the other hand, drawability is scarified when the glass transition temperature exceeds 160° C.

As a polymer (A) meeting all of the above three requirements, there can be mentioned, among others, brominated or chlorinated phenoxyether polymer, polyethylene naphthalate, bisphenol-aromatic dicarboxylic acid polycondensate (polycondensates of any of bisphenols such as bisphenol A, tetrabromobisphenol A, 1,1-bis-(4-hydroxyphenyl)cyclohexane, 4,4'-dihydroxytetraphenylmethane, bisphenol S, etc. with dicarboxylic acids such as terephthalic acid, isophthalic acid, naphthalene-2,6-dicarboxylic acid, pyridine-2,5-dicarboxylic acid, diphenyl-4,4-dicarboxylic acid, etc. and derivatives thereof), polyvinylnaphthalene, polyvinylcarbazole, polypentabromophenyl methacrylate, polypentachlorophenyl methacrylate, poly($\alpha$-naphthyl methacrylate), poly(p-divinylbenzene) and so on. The polymer (A) may be a copolymer (inclusive of graft copolymer), a composition of coexisting polymers, a post-modified polymer, a polymer blend and so on.

Among the above polymers, brominated or chlorinated phenoxyether crosslinking resin and polyethylene naphthalate are particularly important. While the characteristic values of these polymer films are dependent on the molecular weight, film-forming technology and degree of halogenation, among other things, some typical characteristics values are shown below.

| | $n_D$ | $\nu_D$ | $T_g$ |
| --- | --- | --- | --- |
| Brominated phenoxyether polymer | 1.64 | 24 | 149 |
| Chlorinated phenoxyether polymer | 1.63 | 25 | 140 |
| Polyethylene naphthalate | 1.65 | 19 | 113 |
| Polyvinylnaphthalene | 1.68 | 21 | 158 |
| Polyvinylcarbazole | 1 68 | 19 | 84 |
| Poly(p-divinylbenzene) | 1.62 | 28 | 106 |

The polymer films heretofore proposed as phase difference films are deviating from the above-mentioned range of refractive index $n_D$, Abbe number $\nu_D$ or glass transition temperature $T_g$ and are, therefore, not effective enough to accomplish the objectives.

Polycarbonate: $n_D = 1.58-1.59$
Polymethyl methacrylate: $n_D = 1.49$, $\nu_D 57$
Polyvinyl alcohol: $n_D = 1.49-1.53$
Polyethylene terephthalate: $n_D = 1.53$
Polyethylene: $n_D = 1.51$
Polypropylene: $n_D = 1.49$
Polyvinyl chloride: $n_D = 1.54-1.55$
Polysulfone: $T_g > 160°$ C.
Polyethersulfone: $T_g > 160°$
Polyarylate: $n_D = 1.61$, $\nu_D = 26$, $T_g - 215°$ C.
Polystyrene: $n_D = 1.59$, $\nu_D = 31$
Polyphenylene oxide: $T_g = 209°$ C.
Polyacrylonitrile: $n_D = 1.52$, $\nu_D = 52$
Cellulosic polymer: $n_D = 1.49 - 1.51$
Amorphous polyolefin: $n_D = 1.52$
Nylon 6: $n_D = 1.52-1.53$, $\nu_D = 40$
ABS resin: $n_D = 1.54$
Polyester copolymer: $n_D = 1.52-1.57$
Phenoxyether polymer, neither brominated nor chlorinated: $n_D < 1.60$
Polytetrafluoroethylene: $n_D = 1.35$
Polymer (B)

As the polymer (B), a polymer capable of giving a film having a refractive index of $n_D < 1.60$ is employed. However, if this refractive index $n_D$ is too small, scattering of light will occur when the polymer is blended with polymer (A) and molded into a film. Therefore, the refractive index is preferably not less than $n_D = 1.50$.

Unlike polymer (A), there is no critical limitation on the Abbe number $\nu_D$ of polymer (B). Thus, the Abbe number $\nu_D$ may be smaller than 30.0 or exceed 30.0. However, since few polymers give Abbe numbers below 30.0, this value is usually over 30.0. As to glass transition point Tg, too, it may be lower than 60° C. or exceed 160° C., for the necessary heat resistance and drawability can be obtained on blending with polymer (A).

The polymer (B) which can be used for this purpose includes polycarbonate, phenoxyether polymer, polystyrene, nylon-6, polybutylene terephthalate, polyarylate, polysulfone, polyethersulfone, polyphenylene sulfide, polyphenylene oxide and polyparabanic acid, etc.

The desired polymer film can be obtained by molding a composition comprising said polymers (A) and (B) into a film by casting or melt extrusion.

Drawing of a polymer film is generally carried out at or around a temperature higher than the glass transition temperature $T_g$ by 5° to 40° C., particularly about 10° to 30° C., and the drawing is preferably followed by aging. In many cases, the draw ratio is approximately 1.1 to 6, particularly 1.2 to 4, per direction.

It is also possible to draw film in one direction with restriction of draw ratio in a perpendicular direction or restriction of shrinkage in a perpendicular direction and, in such a case, the film becomes a biaxially oriented film.

It is particularly preferable that the retardation value R of the oriented film be 60 to 1000 nm. If the retardation value R of the oriented film is less than 60 nm, the phase difference function will be inadequate. On the other hand, when the retardation value R exceeds 1000 nm, the film thickness must be markedly increased but if it be so done, the optional homogeneity is sacrificed and the hue compensating effect is reduced.

The retardation value R, referred to above, is an indicator which can be expressed by the following equation.

$$R = d \cdot |n_1 - n_2| = \Delta n \cdot d$$

(wherein d represents the thickness of film, $n_1$ represents the refractive index in the direction of optic axis or the direction at right angles therewith, $n_2$ represents the refractive index in the direction perpendicular to the direction of $n_1$, and the refractive index is a value relative to the sodium D line).

It is particularly desirable that said oriented film has a wavelength dispersion value of $\nu_{RF} \geq 1.10$. The wavelength dispersion value $\nu_{RF}$ is an indicator which is defined by the following equation.

$$\nu_{RF} = \Delta n \cdot d(450 \text{ nm}) / \Delta n \cdot d(590 \text{ nm})$$

If this value is less than 1.10, the dispersibility will be inadequate so that the problems of coloration and low contrast ratio of display cannot be solved. The wavelength dispersion value $\nu_{RF}$ preferably approximates the value of the liquid crystal, namely 1.10 to 1.18. However, depending on compensating conditions for the liquid crystal cell, there are cases in which a marked color compensation effect can be obtained even at a large value of 1.2.

Therefore, the blending ratio of polymers (A) and (B), polymer film thickness and drawing conditions should be selected to give the above retardation value and wavelength dispersion value $\nu_{RF}$. In many instances, the blending ratio of polymers (A) and (B) is 20:80–95:5 and preferably 30:70–90:10, by weight, although this range is not critical.

Optically compensating film

The optically compensating film comprising said oriented film is generally protected by laminating an optically isotropic film at least on one side thereof to thereby provide an optical compensator.

The optically isotropic film for such purposes includes the films of, among others, cellulosic polymer (e.g. cellulose triacetate), polycarbonate, polyparabanic acid resin, polystyrene, polyethersulfone, polyarylene ester, polysulfone, polyvinyl chloride, poly-4-methylpentene, polyphenylene oxide, oxygen-impermeable resin, crosslinked resin and so on. The oxygen-impermeable resin mentioned above includes polyvinyl alcohol, ethylene-vinyl alcohol copolymer, polyacrylonitrile, polyvinylidene chloride, etc. and the crosslinked resin includes crosslinked phenoxyether resin, epoxy resin, acrylate resin, acrylepoxy resin, urethane resin, etc. Not only a single-layer film but also a composite film such as an ethylene-vinyl alcohol copolymer/phenoxyether crosslinked resin film can be employed. The retardation value of the optically isotropic film is preferably not greater than 30 nm and, for still better results, not greater than 10 nm.

The ease of handling up to the fabrication of a liquid crystal display can be insured by disposing a release sheet through a pressure-sensitive adhesive layer on at least one side of said optically compensating film or optical compensator.

The optically compensating film or optical compensator of the invention can be assembled with a polarizer to provide an optical compensator equipped with a polarizer or used as the substrate of a liquid crystal cell or laminated with a liquid crystal cell substrate prior to the fabrication of the liquid crystal cell to provide a liquid crystal cell panel equipped with an optical compensator.

(Operation)

According to the research done by the inventors of the present invention, it was discovered that when a polymer film having a refractive index of $n_D \geq 1.60$, an Abbe number of $\nu_D \leq 30.0$ and a glass transition temperature $T_g$ of 60°–160° C. is oriented in at least one direction, the wavelength dispersion value $\nu_{RF}$ is increased as an "attribute" of such film. Therefore, as a polymer film having such characteristic value is selected and drawn with due attention to thickness, there can be obtained an oriented film with a retardation value in the range of 60–1000 mm and a wavelength dispersion value of $\nu_{RF}$ 1.10. Since this oriented film has such a large wavelength dispersion value $\nu_{RF}$, the use of the film (2 or more can be used) results in marked improvements in coloration and contrast ratio. However, since polymers having the above characteristic values are generally expensive and not necessarily easily controllable in film formation and drawing, there is a cost disadvantage and, moreover, sophisticated production technology is required. Therefore, in the present invention, a balance is sought by blending polymer (B) with polymer (A) with due attention paid to the refractive index $n_D$ of polymer (B) for prevention of the scattering of light to thereby achieve the necessary retardation value and wavelength dispersion value $v_{RF}$.

(Effect of the Invention)

The optically compensating film or optical compensator of the present invention is characterized in that a film manufactured by blending polymer (A) with polymer (B) in an ingenious combination is drawn to give an oriented film having the necessary retardation value R and wavelength dispersion value $v_{RF}$. Therefore, the liquid crystal display incorporating this optical compensator is remarkably improved in the coloration and contrast ratio which are the drawbacks of the FTN mode while the advantages of the mode, namely its minimal weight and thickness as well as brightness, are exploited.

Figure 1:
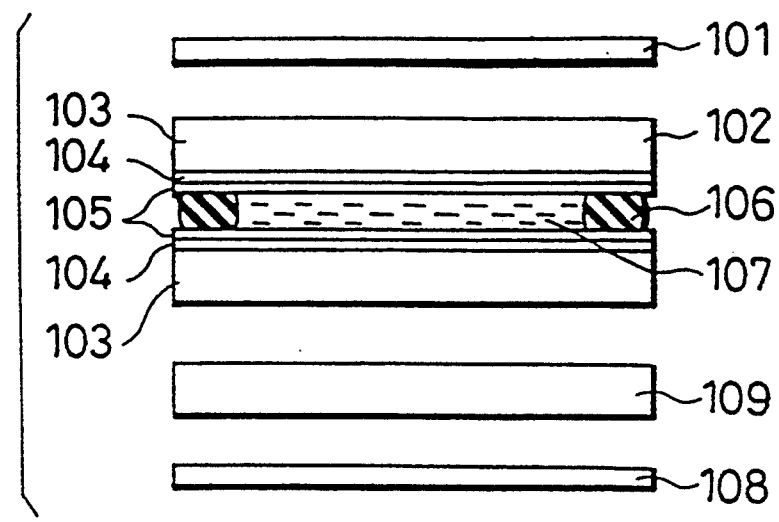
FIG. 1 is a schematic view illustrating the construction of a liquid crystal display incorporating the optical compensator of the invention.

The legends used on the drawings have the following meanings.

(101) . . . Upper polarizer
(102) . . . Liquid crystal cell
(103) . . . Substrate
(104) . . . Transparent electrode
(105) . . . Oriented film
(106) . . . Spacer
(107) . . . Liquid crystal
(108) . . . Lower polarizer
(109) . . . Optical compensator
(201) . . . Upper polarizer
(202) . . . Liquid crystal cell
(203) . . . Substrate
(204) . . . Transparent electrode
(205) . . . Oriented film
(206) . . . Spacer
(207) . . . Liquid crystal
(208) . . . Lower polarizer
(209) . . . Optically compensating film
(210) . . . Optically compensating film
(301) . . . Upper polarizer
(302) . . . Liquid crystal cell
(303) . . . Substrate
(304) . . . Transparent electrode
(305) . . . Oriented film
(306) . . . Spacer
(307) . . . Liquid crystal
(308) . . . Lower polarizer
(309) . . . Optically compensating film
(310) . . . Optically compensating film
(401) . . . Angle of twist of liquid crystal
(402) . . . Direction of rubbing of upper substrate
(403) . . . Angle from horizontal direction to direction of rubbing of upper substrate
(404) . . . Direction of rubbing of lower substrate
(405) . . . Direction of polarization axis of upper polarizer
(406) . . . Angle from horizontal direction to direction of polarization axis of upper polarizer
(407) . . . Direction of polarization axis of lower polarizer
(408) . . . Angle from horizontal direction to direction of polarization axis of lower polarizer
(409) . . . Direction of orientation axis of optical compensator
(410) . . . Angle from horizontal direction to direction of orientation axis of optical compensator
(501) . . . Angle of twist of liquid crystal
(502) . . . Direction of rubbing of upper substrate
(503) . . . Angle from horizontal direction to direction of rubbing of upper substrate
(504) . . . Direction of rubbing of lower substrate
(505) . . . Direction of polarization axis of upper polarizer
(506) . . . Angle from horizontal direction to direction of polarization axis of upper polarizer
(507) . . . Direction of polarization axis of lower polarizer
(508) . . . Angle from horizontal direction to direction of polarization axis of lower polarizer
(509) . . . Direction of orientation axis of upper optically compensating film
(510) . . . Angle from horizontal direction to direction of orientation axis of upper optically compensating film
(511) . . . Direction of orientation axis of lower optically compensating film
(512) . . . Angle from horizontal direction to direction of orientation axis of lower optically compensating film

BEST MODE FOR CARRYING OUT THE INVENTION

The following examples are further illustrative of the invention. In the following disclosure, all parts are by weight.

EXAMPLE 1

A brominated phenoxyether resin with a bromine content of 52.9 weight % (Tohto Kasei Co., Ltd., YPB-43C), the chemical formula of which is presented below (Chemical Formula 1), which gives a cast film having a refractive index of $n_D=1.64$, an Abbe number of $v_D=24$ and a DSC glass transition temperature of $Tg=149°$ C. and a polycarbonate giving a cast film with a refractive index of $n_D=1.59$, an Abbe number of $v_D=30.3$ and a DSC glass transition temperature of $Tg=135°$ C. were provided.

A solution containing 20 parts of the above brominated phenoxyether resin and 5 parts of the polycarbonate in 75 parts of cyclohexanone was cast on a polyester film support and partially dried until the solvent residue was 5 weight %. The cast film was exfoliated from the polyester support and dried until the residual solvent was nil. The resulting film had a thickness of 110 μm, a refractive index of $n_D=1.63$, an Abbe number of $v_D=25$, a DSC glass transition temperature of $Tg=138°$ C. and a retardation value of $R=2$ nm.

This film was then drawn 2-fold in one direction at 162° C. and subjected to aging at the same temperature for 8 seconds, after which both edges were trimmed off. The procedure gave an optically compensating film comprising an oriented film having a thickness of 78 μm, a retardation value of R=575 nm and a wavelength dispersion value of $v_{RF}=1.13$. So, optically isotropic films each comprising a 60 μm thick cellulose triacetate film were laminated on respective sides of the above optically compensating film with an urethane adhesive to provide an optical compensator.

A release sheet having an adhesive layer was prepared by applying a acrylic pressure-sensitive adhesive in a thickness of 30 μm on a release-treated side of a 40 μm-thick polyester film release sheet and this release sheet was laminated on either side of the optical compensator prepared above. To put the optical compensator to use, the release sheet only is peeled off and the remainder is bonded to the substrate.

Figure 4:
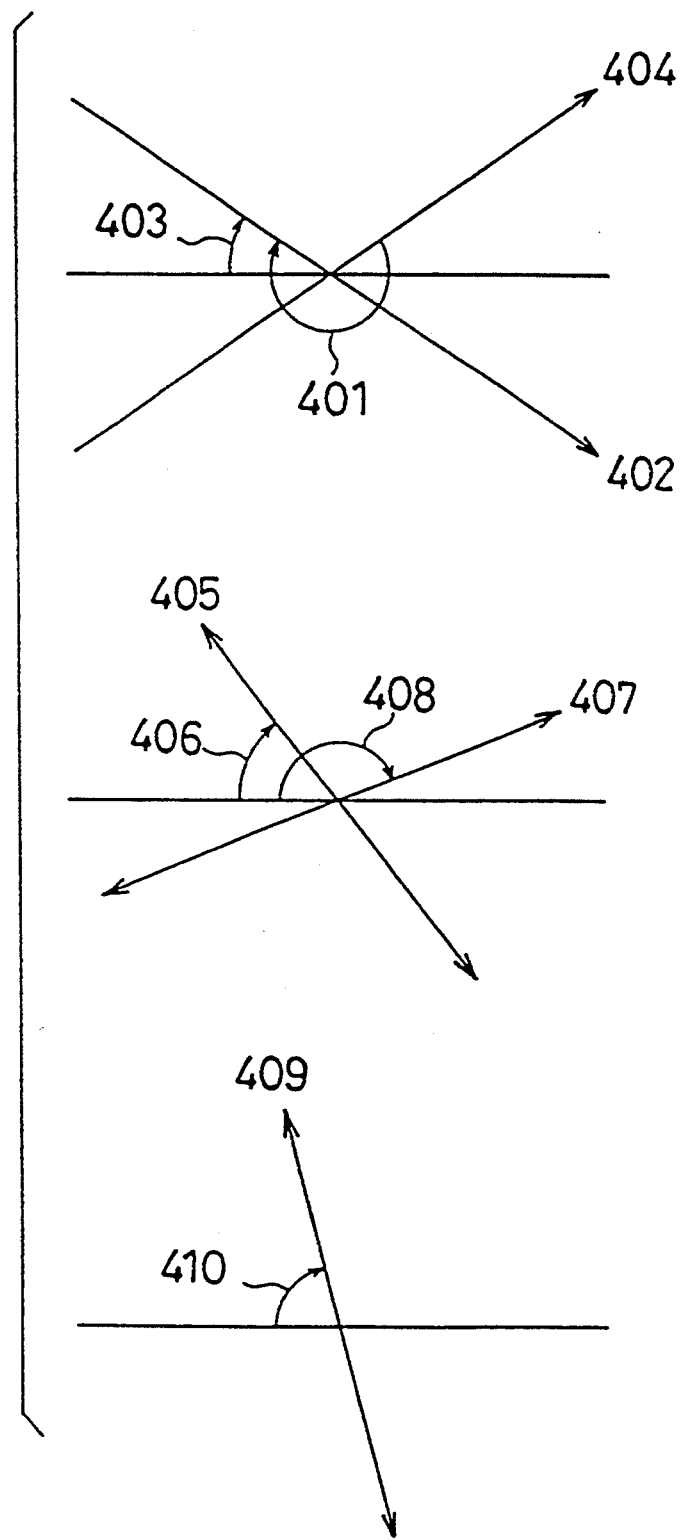
FIG. 4 is a diagram showing the orientational relationship of axes in the liquid crystal display used in the examples of the invention.

Using this optical compensator, a liquid crystal display device comprising the polarizer/liquid crystal cell/optical compensator/polarizer was fabricated. FIG. 1 is a schematic view showing a liquid crystal display incorporating the optical compensator of this example. The liquid crystal cell (102) contains a liquid crystal (107) in the space defined by juxtaposed substrate (103) each carrying transparent electrodes (104) and rubbed oriented films (105) with the interposition of spacer means (106). The optical compensator (109) is positioned below said liquid crystal cell (102) and the assembly is sandwiched between the upper polarizer (101) and lower polarizer (108). FIG. 4 shows the orientational relationship of axes in the liquid crystal display of FIG. 1 as viewed from top. The reference numeral (401) stands for the angle of twist of the liquid crystal, (403) for the angle from the horizontal direction to the direction of rubbing (402) of the upper substrate of the liquid crystal cell, (404) for the direction of rubbing of the lower substrate of the liquid crystal cell, (406) for the angle from the horizontal direction to the direction of polarization axis (405) of the upper polarizer, (408) for the angle from the horizontal direction to the direction of polarization axis of the lower polarizer, and (410) for the angle from the horizontal direction to the direction of orientation axis (409) of the optical compensator. The direction of angle is positive when it is clockwise. The product $\Delta n \cdot d$ of refractive index anisotropy $\Delta n$ of liquid crystal and cell thickness d was 0.86 μm. The angle of twist (401) of liquid crystal was set at 240° clockwise from down to up, the angle (403) was set at 30°, the angle (406) at 65°, the angle (408) at 95°, and the angle (410) at 50°. The polarizer used here comprised a polyvinyl alcohol-iodine polarizing film and a cellulose triacetate film bonded to either side thereof and had a visible light transmissivity of 42% and a polarization degree of 99%. The liquid crystal sealed in the liquid crystal cell was a nematic liquid crystal giving a wavelength dispersion value of $v_{LC}=1.14$. This liquid crystal was a composition which can be represented by the following chemical formula (2).

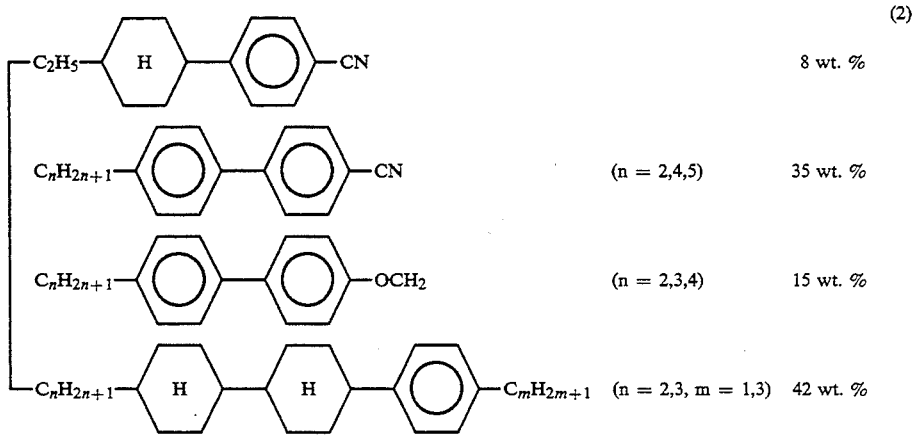

(2)

This liquid crystal display had been improved remarkably in coloration and contrast ratio and somewhat in brightness, too, thus being substantially comparable to a liquid crystal display using a hue-compensating liquid crystal cell. The optically compensating film can be used in lieu of the optical compensator.

EXAMPLE 2

A polyethylene naphthalate giving a melt-extruded film having a refractive index of $n_D=1.65$, an Abbe number of $v_D=18$ and a DSC glass transition temperature of Tg=113° C. and a polyethylene terephthalate giving a melt-extruded film having a refractive index of $n_D=1.56$, an Abbe number of $v_D=36$ and a DSC glass transition temperature of Tg=72° C. were provided.

A composition comprising the above polyethylene naphthalate and polyethylene terephthalate in a weight ratio of 70:30 was fed to an extruder and extruded at a temperature of 290° C. to provide a film having a thickness of 92 μm, a glass transition temperature of Tg=108° C. and a retardation value of R=18 nm.

This film was then drawn 1.9-fold in one direction at a temperature of 125° C. and subjected to 4 seconds of aging at the same temperature, after which both edges were trimmed off. The above procedure gave an optically compensating film (optical compensator) comprising an oriented film having a thickness of 65 μm, a retardation value of R=575 nm and a wavelength dispersion value of $v_{RF}=1.15$.

Using the above optical compensator, a liquid crystal display was fabricated in otherwise the same manner as Example 1. This liquid crystal display had been remarkably improved in coloration and contrast ratio and was substantially comparable to a liquid crystal display incorporating a hue compensating LC cell.

EXAMPLE 3

The procedure of Example 1 was repeated except that chlorinated phenoxyether resin was used in lieu of brominated phenoxyether resin. The result was as satisfactory as the result obtained in Example 1.

Comparative Example 1

A polycarbonate film was prepared by the casting technique. This film had a thickness of 170 μm, a refractive index of $n_D=1.58$, an Abbe number of $\nu_D=30.3$, a glass transition temperature of Tg=140° C. and a retardation value of R=7 nm.

This film was then drawn 2-fold in one direction at 170° C. and subjected to 6 seconds of aging at 165° C., after which both edges were trimmed off. The procedure gave an oriented film having a thickness of 110 μm, a retardation value of R=570 nm and a wavelength dispersion value of $\nu_{RF}=1.09$.

Then, a couple of optically isotropic films each comprising a 50 μm thick cellulose triacetate film were bonded to respective sides of the above oriented film with an urethane adhesive to fabricate an optical compensator.

Using this optical compensator, a liquid crystal display was fabricated as in Example 1. This liquid crystal display showed an intense blue color and had a low contrast ratio.

Comparative Example 2

The procedure of Comparative Example 1 was repeated using polymethyl methacrylate, polyvinyl alcohol, ethylene-vinyl alcohol copolymer, polyethylene terephthalate, polybutylene terephthalate, polyethylene, polypropylene, polyvinyl chloride, polystyrene, phenoxyether polymer and polyacrylonitrile. Thus, each of these polymers was cast into a film and monoaxially oriented with a draft ratio of 1.5 to 4 and a couple of optically isotropic films each comprising a cellulose triacetate film were laminated on respective sides of the oriented film to fabricate an optical compensator. Using this optical compensator, a liquid crystal display was constructed and evaluated. As a result, all the displays showed similar colorations and had low contrast ratios just as in Comparative Example 1.

EXAMPLE 4

A polyethylene naphthalate giving a melt-extruded film having a refractive index of $n_D=1.65$, an Abbe number of $\nu_D=18$ and a DSC glass transition temperature of Tg=113° C. and a polyethylene terephthalate giving a melt-extruded film having a refractive index of $n_D=1.56$, an Abbe number of $\nu_D=36$ and a DSC glass transition temperature of Tg=72° C. were blended in a weight ratio of 70:30. This composition was fed to an extruder and extruded into a film. This film was monoaxially drawn to give an optically compensating film having a thickness of 78 μm, a retardation value of R=420 nm and a wavelength dispersion value of $\nu_{RF}=1.14$.

Figure 2:
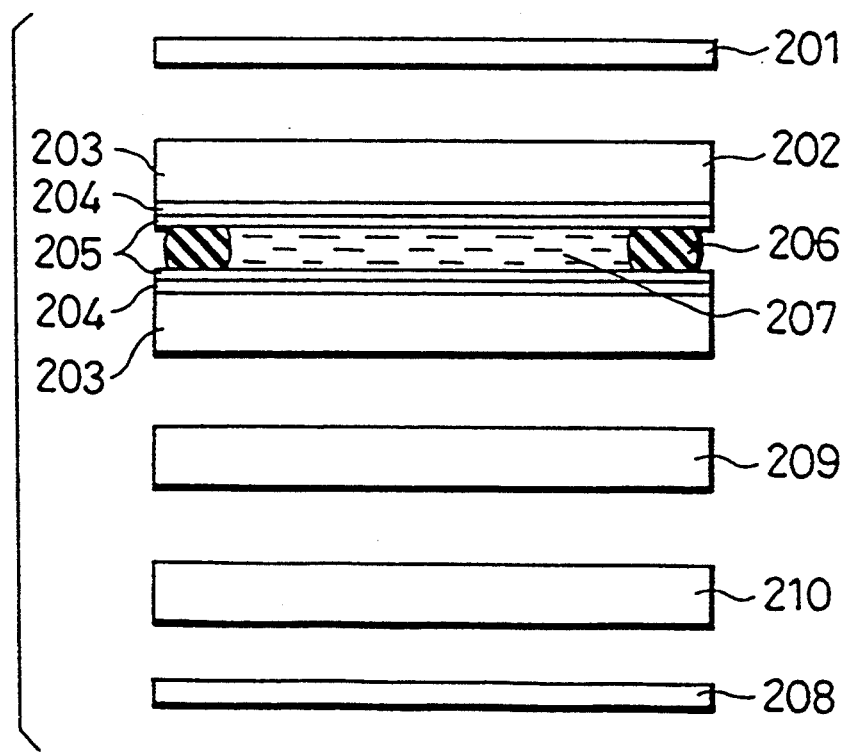
FIG. 2 is a schematic view showing the architecture of a liquid crystal display device incorporating the optically compensating film of the invention.
Figure 5:
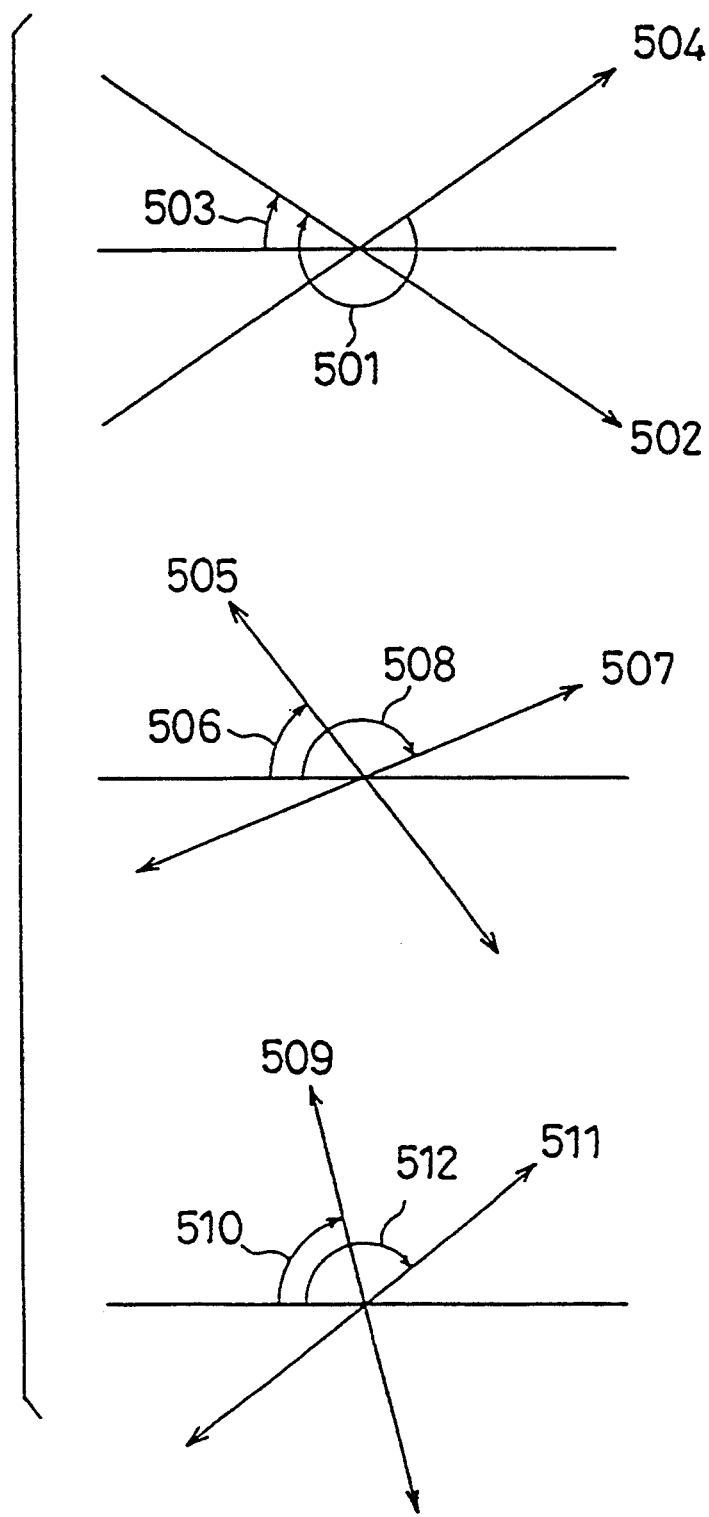
FIG. 5 is a diagram showing the orientational relationship of axes in the liquid crystal display used in the examples of the invention.

Using two units of this optically compensating film, a liquid crystal display having a structure of polarizer/liquid crystal cell/optically film/optically compensating film/polarizer was fabricated. FIG. 2 is a schematic view of this liquid crystal display incorporating the optically compensating film of this example. The liquid crystal cell (202) contains a liquid crystal (207) in the space defined by juxtaposed substrate (203) each carrying transparent electrodes (204) and rubbed oriented films (205) with the interposition of spacer means (206). Disposed below this liquid crystal cell (202) are said optically compensating films (209), (210) and the assembly is sandwiched between an upper polarizer (201) and a lower polarizer (208). The orientational relationship of axes in this liquid crystal display as viewed from the top of FIG. 2 is shown in FIG. 5. The reference numeral (501) stands for the angular dimension of twist of the liquid crystal, (503) for the angle from the horizontal direction to the direction of rubbing (502) of the upper substrate of liquid crystal cell (202), (504) for the direction of rubbing of the lower substrate of liquid crystal cell (202), (506) for the angle from the horizontal direction to the direction of polarization axis (505) of the upper polarizer, (508) for the angle from the horizontal direction to the direction of polarization axis (507) of the lower polarizer, (510) for the angle from the horizontal direction to the direction of orientation axis (509) of the upper optically compensating film, and (512) for the angle from the horizontal direction to the direction of orientation axis (511) of the lower optically compensating film. The clockwise angle is positive. The product Δn·d of refractive index anisotropy Δn of liquid crystal and cell thickness d was 0.86 μm. The angle of twist (501) of the liquid crystal was set, in the clockwise direction from down to top, at 204°, the angle (503) at 30° C., the angle (506) at 0°, the angle (508) at 90°, the angle (510) at 70°, and the angle (512) at 30°. This liquid crystal display had been much more improved in coloration and contrast ratio as compared with the liquid crystal display of Example 2 and was fully comparable to a liquid crystal display incorporating a hue compensating liquid crystal cell. Further improvements in coloration and contrast ratio can also be obtained when 3 or more units of an optically compensating film having a retardation value different from that of the above optically compensating film in lieu of two units of the above optically compensating films between the polarizer and liquid crystal cell. The optical compensator can be used in lieu of the optically compensating film.

EXAMPLE 5

A polyethylene naphthalate giving a melt-extruded film having a refractive index of $n_D=1.65$, an Abbe number of $\nu_D=18$ and a DSC glass transition temperature of Tg=113° C. and a polyethylene terephthalate giving a melt-extruded film having a refractive index of $n_D=1.56$, an Abbe number of $\nu_D=36$ and a DSC glass transition temperature of Tg=72° C. were blended in a weight ratio of 75:25. This composition was fed to an extruder and extruded into a film. The film was monoaxially drawn to provide an optically compensating film having a thickness of 85 μm, and a retardation value of R=400 nm.

Figure 3:
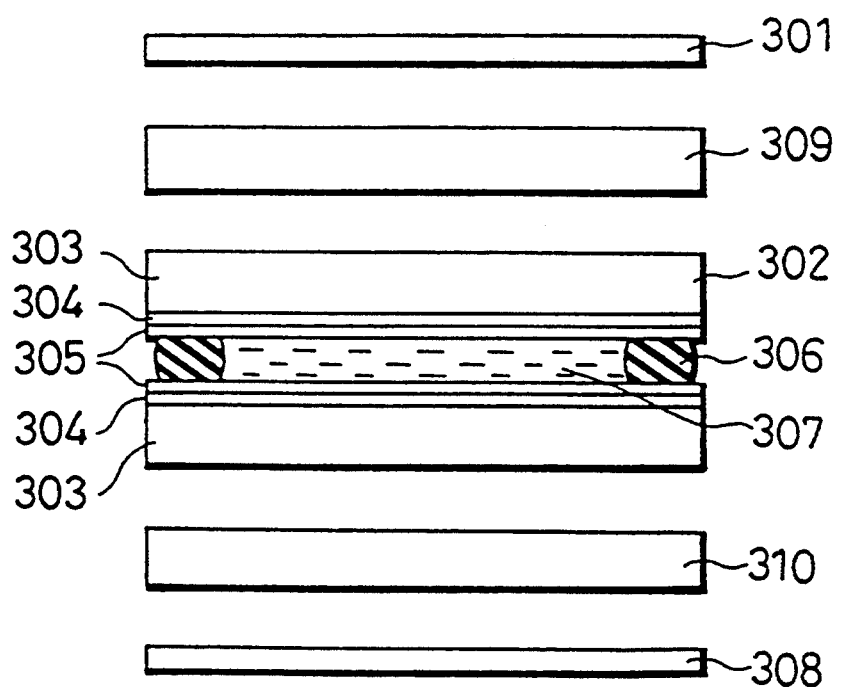
FIG. 3 is a schematic view showing the architecture of a liquid crystal display device incorporating the optically compensating film of the invention.

Using two units of this optically compensating film, a liquid crystal display having an architecture of polarizer/optically compensating film/liquid crystal cell/optically compensating film/polarizer was fabricated. FIG. 3 is a schematic illustration of this liquid crystal display incorporating the optically compensating film of this example. The liquid crystal cell (302) contains a liquid crystal (307) in the space defined by juxtaposed substrates (303) each carrying a transparent electrode (304) and a rubbed oriented film (305) with the interposition of spacer means (306). The optical compensators (309) and (310) are disposed on respective sides of the above liquid crystal cell (302) and the assembly is sandwiched between the upper polarizer (301) and the lower polarizer (308). The orientational relationship of axes in the liquid crystal display of FIG. 3, viewed from up, is similar to that shown in FIG. 5. Here, too, the clockwise direction of angle is positive. The product Δnd of the refractive index anisotropy of liquid crystal Δn and cell thickness d was set to 0.86 μm. The angle of twist (501) of the liquid crystal, in the clockwise direction from down to top, was set at 240°, the angle (503) at 30°, the angle (506) at 80°, the angle (508) at 10°, the angle (510) at 110° and the angle (512) at 70°. This liquid crystal display had been much more improved in coloration and contrast ratio as compared with the CLD of Example 2 and was fully comparable to a liquid crystal display incorporating a hue compensating liquid crystal cell. It should be understood that, just as above, further improvements in coloration and contrast ratio can be obtained by using 2 or more units of an optically compensating film having a different retardation value R in lieu of one or both of the above optically compensating film disposed on both sides of the liquid crystal cell. Furthermore, the optical compensator can be used in lieu of the optically compensating film.

INDUSTRIAL APPLICABILITY

The optically compensating film and an optical compensator of the present invention is particularly useful for optical compensation in an STN (supertwisted nematic) liquid crystal display, there is to say on the FTN mode. In addition, it can be used in such applications as goggle transparent and antiglare transparent parts, optical filters and so on.

We claim:

1. An optically compensating film comprising at least one oriented film obtained by stretching, in at least one axis, a film formed from a mixture of a polymer (A) and a polymer (B),
   wherein the polymer (A) is one member selected from the group of polymers which form a film having a refractive index $n_D \geq 1.60$, an Abbe number $\nu_D \leq 30.0$ and a glass transition temperature $Tg = 60°$ to $160°$ C., and
   wherein the polymer (B) is one member selected from the group consisting of polymers which form a film having a refractive index $n_D < 1.60$, and wherein the blending ratio of polymers (A) and (B) is 20:80 to 95:5.

2. An optical compensator comprising an optically compensating film, wherein said optically compensating film comprises at least one oriented film obtained by stretching, in at least one axis, a film formed from a mixture of a polymer (A) and a polymer (B),
   said polymer (A) being one member selected from the group consisting of polymers which form a film having a refractive index $n_D \geq 1.60$, an Abbe number $\nu_D 30.0$ and a glass transition temperature $Tg = 60°$ to $160,°$ C. and
   said polymer (B) being one member selected from the group consisting of polymers which form a film having a refractive index $n_D < 1.60$.

3. An optical compensator according to claim 2, wherein the optically compensating film has a retardation value of $R = 60$ to 1000 nm, and a wavelength dispersion value $\nu_{RF}$ of not less than 1.10, wherein $\nu_{RF}$ is defined by the following equation:

$$\nu_{RF} = \frac{\Delta n \cdot d \text{ at } 450 \text{ nm}}{\Delta n \cdot d \text{ at } 590 \text{ nm}}$$

wherein $\Delta n$ is the refractive index of the oriented film and d is the thickness of the oriented film.

4. An optical compensator comprising a laminate, wherein said laminate comprises:
   (1) at least one optically compensating film comprising at least one oriented film obtained by stretching, in at least one axis, a film formed from a mixture of a polymer (A) and a polymer (B),
   wherein the polymer (A) is one member selected from the group of polymers which form a film having a refractive index $n_D \geq 1.60$, an Abbe number $\nu_D 30.0$ and a glass transition temperature $Tg = 60°$ to $160°$ C., and
   wherein the polymer (B) is one member selected from the group consisting of polymers which form a film having a refractive index $n_D < 1.60$, and
   (2) at least one optically isotropic film laminated to said optically compensating film, wherein the blending ratio of polymers (A) and (B) is 20:80 to 95:5.

5. An optical compensator according to claim 4, wherein the optically compensating film has a retardation value of $R = 60$ to 1000 nm, and a wavelength dispersion value $\nu_{RF}$ of not less than 1.10, wherein $\nu_{RF}$ is defined by the following equation:

$$\nu_{RF} = \frac{\Delta n \cdot d \text{ at } 450 \text{ nm}}{\Delta n \cdot d \text{ at } 590 \text{ nm}}$$

wherein $\Delta n$ is the refractive index of the oriented film and d is the thickness of the oriented film.

6. An optical compensator according to claim 4, wherein the blending ratio of polymers (A) and (B) is 20:80 to 95:5.

7. A liquid crystal display comprising:
   (a) a liquid crystal cell;
   (b) a pair of polarizers disposed on respective sides of said liquid crystal cell; and
   (c) at least one optical compensator interposed between said liquid crystal cell and one polarizer of said pair of polarizers, wherein said optical compensator comprises an optically compensating film which comprises:
      at least one oriented film obtained by stretching, in at least one axis, a film formed from a mixture of a polymer (A) and a polymer (B),
   wherein the polymer (A) is one member selected from the group of polymers which form a film having a refractive index $n_D \geq 1.60$, an Abbe number $\nu_D \leq 30.0$ and a glass transition temperature $Tg = 60°$ to $160°$ C., and
   wherein the polymer (B) is one member selected from the group consisting of polymers which form a film having a refractive index $n_D < 1.60$.

8. A liquid display according to claim 7, wherein the optically compensating film has a retardation value of $R = 60$ to 1000 nm, and a wavelength dispersion value $\nu_{RF}$ of not less than 1.10, wherein $\nu_{RF}$ is defined by the following equation:

$$\nu_{RF} = \frac{\Delta n \cdot d \text{ at } 450 \text{ nm}}{\Delta n \cdot d \text{ at } 590 \text{ nm}}$$

wherein $\Delta n$ is the refractive index of the oriented film and d is the thickness of the oriented film.

9. A liquid crystal display comprising:
   (a) a liquid crystal cell;
   (b) a pair of polarizers disposed on respective sides of said liquid crystal cell; and
   (c) at least one optical compensator interposed between said liquid crystal cell and one polarizer of said pair of polarizers, wherein said optical compensator comprising a laminate, wherein said laminate comprises:

(1) at least one optically compensating film comprising at least one oriented film obtained by stretching, in at least one axis, a film formed from a mixture of a polymer (A) and a polymer (B), wherein the polymer (A) is one member selected from the group of polymers which form a film having a refractive index $n_D \geq 1.60$, an Abbe number $\nu_D \leq 30.0$ and a glass transition temperature Tg=60° to 160° C., and wherein the polymer (B) is one member selected from the group consisting of polymers which form a film having a refractive index $n_D < 1.60$, and (2) at least one optically isotropic film laminated to said optically compensating film, wherein the blending ratio of polymers (A) and (B) is 20:80 to 95:5.

10. A liquid display according to claim 9, wherein the optically compensating film has a retardation value of R - 60 to 1000 nm, and a wavelength dispersion value $\nu_{RF}$ of not less than 1.10, wherein $\nu_{RF}$ is defined by the following equation:

$$\nu_{RF} = \frac{\Delta n \cdot d \text{ at } 450 \text{ nm}}{\Delta n \cdot d \text{ at } 590 \text{ nm}}$$

wherein $\Delta n$ is the refractive index of the oriented film and d is the thickness of the oriented film.

* * * * *